United States Patent [19]

Stenstrom

[11] Patent Number: 5,737,346
[45] Date of Patent: Apr. 7, 1998

[54] MOUNT FOR OPTICAL COMPONENTS

[75] Inventor: Jeffrey J. Stenstrom, Long Beach, Calif.

[73] Assignee: Hughes Electronics, Los Angeles, Calif.

[21] Appl. No.: 674,291

[22] Filed: Jul. 1, 1996

[51] Int. Cl.$^6$ ............... H01S 3/108; G02B 7/00
[52] U.S. Cl. ............... 372/21; 359/326; 359/831
[58] Field of Search ............... 372/21, 22, 107; 385/52, 53, 55, 88, 90–92, 134, 136, 137; 359/326, 328, 808, 811, 819, 820, 831, 871, 892, 894, 896

[56] References Cited

U.S. PATENT DOCUMENTS

| H396 | 1/1988 | Spry | 359/831 |
|---|---|---|---|
| 4,274,708 | 6/1981 | Cocito et al. | 385/55 X |
| 4,342,113 | 7/1982 | Iwata | 372/33 |
| 4,600,272 | 7/1986 | Dost et al. | 359/896 |
| 5,181,211 | 1/1993 | Brunham et al. | 372/21 |
| 5,210,649 | 5/1993 | Weissmann | 359/819 |
| 5,459,609 | 10/1995 | Schrag | 359/894 X |

FOREIGN PATENT DOCUMENTS

| 0067405-A2 | 12/1982 | European Pat. Off. |
| 3121495-A1 | 12/1982 | Germany. |
| 3903196-A1 | 8/1990 | Germany. |

*Primary Examiner*—John D. Lee
*Attorney, Agent, or Firm*—Gordon R. Lindeen, III; Michael W. Sales; Wanda K. Denson-Low

[57] ABSTRACT

An optical mount secures an optical component so that its freedom of movement is restricted in all directions. The mount uses a spring retainer assembly to urge the optical component against various faces of the mount. The mount is especially well suited for work with crystals, such as frequency doubling or optical parametric oscillation crystals.

20 Claims, 4 Drawing Sheets

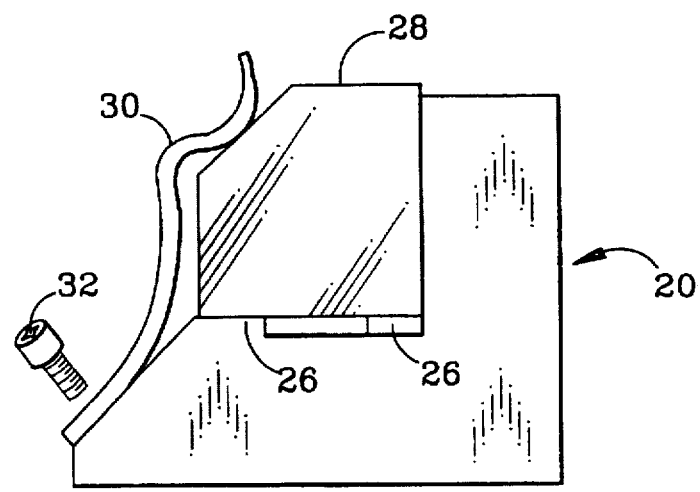
FIG.2
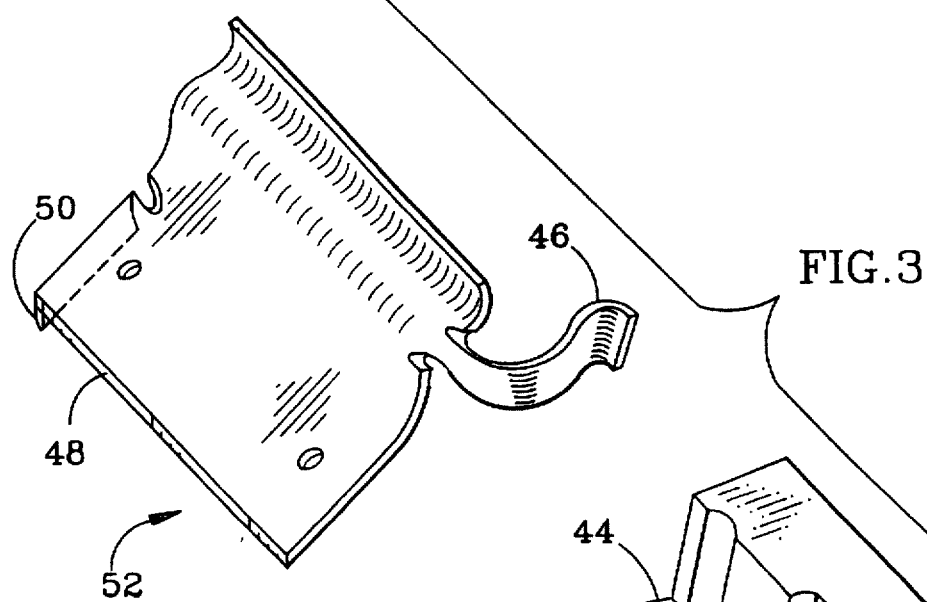
FIG.3
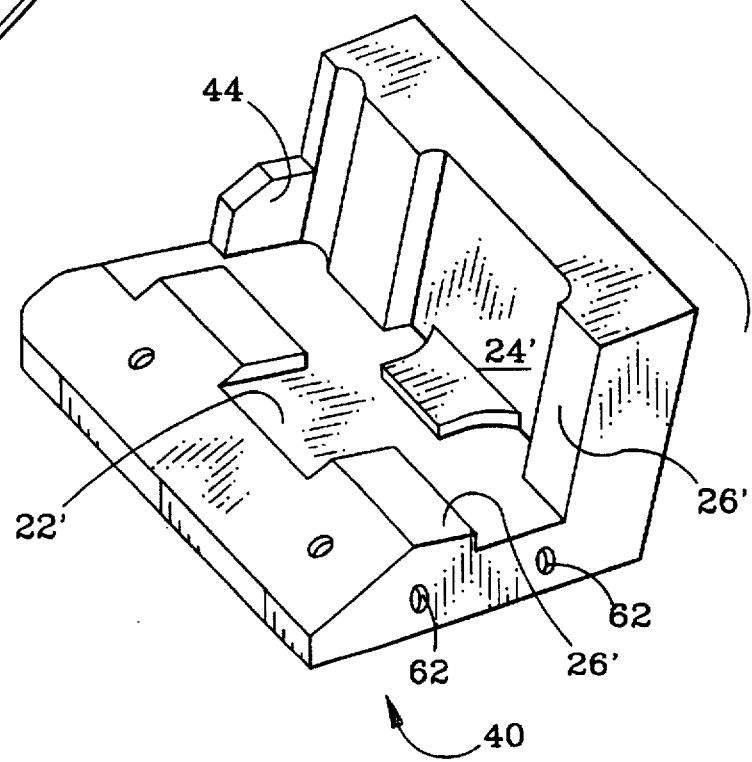

MOUNT FOR OPTICAL COMPONENTS

BACKGROUND OF THE INVENTION

1. Field of the Invention

This invention relates to a mount for use with optical components, particularly when they must be rigidly aligned.

2. Description of the Related Art

Optical systems generally require the precise and rigid alignment of lenses, prisms, mirrors, and other optical components. Proper alignment is especially important in laser systems, where misalignment of the optical cavity can interfere with the feedback necessary for optical amplification, thereby reducing or eliminating the optical gain needed for a laser. In addition, frequency doubling and other nonlinear processes involving crystals often require that the crystal be precisely aligned in order to achieve the optimum conversion efficiency. Stable alignment is therefore especially critical for intracavity, nonlinear crystal resonator configurations, in which the crystal resides within the resonator. Alignment problems are considerably aggravated when the resonator is subjected to vibrations. Temperature cycling presents problems as well, since the optical components may expand and contract with changes in temperature at different rates.

To minimize alignment problems, optical mounts are frequently used to secure optical components. A retainer ring, spring retainer or some other means for exerting pressure secures the optical component to the mount, thereby reducing the chance that the optical component will be moved out of alignment. Often, however, pressure is exerted only in one direction, so that the optical piece may be protected against, say, translational movement but still may be subject to small perturbations in the rotational direction. For example, many optical mounts (especially prism mounts) make use of a spring retainer, in which the spring retainer contacts the top of the optical component, urging it down against a base plate. In this way, the optical component is kept from being translated but can still be jostled such that it rotates slightly. Conversely, many lens and mirror mounts secure their optical components at their perimeter, thereby preventing rotations about their axis of symmetry. Nevertheless, they might still be vulnerable to being rotated about other axes or translational slippage. Another common technique is to clamp the optical component in place with a rod that urges the optical component against one or more base plates, where the rod is attached to a post with locking screws, and the rod in turn is securely attached to the base plates. The use of screws can be problematic, however, since they can loosen in time, particularly when they are exposed to temperature cycling.

The use of epoxies may be suitable for room temperature work but can lead to problems if the optical components must undergo variations in temperature, since epoxies and optical materials generally have different temperature coefficients of expansion. Thus, the epoxy can expand or contract which can displace the optical component or even break the bond.

It is generally desirable, however, to minimize rotational and translational shifts in as many directions as possible. Ideally, one would like to restrain an optical component from the slightest movement in any direction even under non-ideal circumstances, such as those arising from vibrations and variations in temperature.

SUMMARY OF THE INVENTION

In accordance with the present invention, an optical mount is disclosed in which an optical component is prevented from moving in any direction. The mount is designed to hold the optical component in place over a wide range of temperatures and to function well in the presence of vibrations. The mount is best suited for use with optical components in the shape of rectangular parallelopipeds having an additional face (including prisms, beamsplitters, and crystals) that mates with a spring retainer, but the mount can also work with other shapes. The mount is especially well suited for use with crystals, such as frequency doubling or optical parametric oscillation crystals.

The mount uses one or more spring retainers to urge an optical piece against several mounting surfaces that are distributed among the faces of the mount. Because the mounting surfaces are oriented in different planes, the optical piece is prevented from either rotational or translational motion and in this way is held securely in the mount. This construction is therefore well suited for situations in which the optical component is subjected to vibrations. Likewise, the alignment of the optical component is relatively insensitive to changes in temperature, since a spring retainer will hold the optical component in place even if the optical component, the mount and the spring retainer have different thermal coefficients of expansion. This arrangement is therefore different from a mounting apparatus in which screws are used directly or indirectly to apply pressure to the optical component. In that case, alignment of the optical component can shift as the screws tighten or loosen with changes in temperature.

One preferred embodiment of the invention is a mount for an optical component that keeps the component from moving in any direction. The mount includes a base and at least one spring retainer. The base has three faces that are at right angles to each other. One of the faces has three mounting surfaces that define a plane for supporting an optical component. Another face has two mounting surfaces that keep the optical component from tilting or rotating when the spring retainer is engaged, while the third face keeps the optical component from sliding. The spring retainer is preferably mounted to the base by screws. The spring retainer contacts the optical component and applies pressure to it, urging it towards those faces of the base having two and three mounting surfaces, respectively.

A second spring retainer can be used to urge the optical component towards the third face of the base, thus keeping the optical component from sliding. In this way, the optical component is completely restrained and can not slide or rotate. Alternatively, a single spring retainer assembly can be used that is equipped with a metallic finger that forces the optical component towards the third face of the base, provided that the spring retainer assembly has been first properly aligned with a metallic alignment tang that is also attached to the spring retainer assembly. With either of these two configurations, the optical component is restrained from moving in any direction, which is particularly important for applications such as frequency doubling or optical parametric oscillation.

Another preferred embodiment is similar to the one just described, except that neither a second spring retainer nor a metallic finger is used to prevent the optical component from sliding in a direction normal to the third face of the base. Although the optical component is consequently not as rigidly mounted in this case, this design is considerably simpler.

Further features and advantages of the invention will be apparent to those skilled in the art from the following detailed description, taken together with the accompanying drawings.

DESCRIPTION OF THE DRAWINGS

FIG. 2 is a side elevational view of the embodiment of the invention shown in FIG. 1, with the side spring retainer mounted to the base and contacting the optical component;

FIG. 3 is an exploded perspective view of another embodiment of the invention designed to completely restrain an optical component;

DETAILED DESCRIPTION OF THE INVENTION

Figure 1:
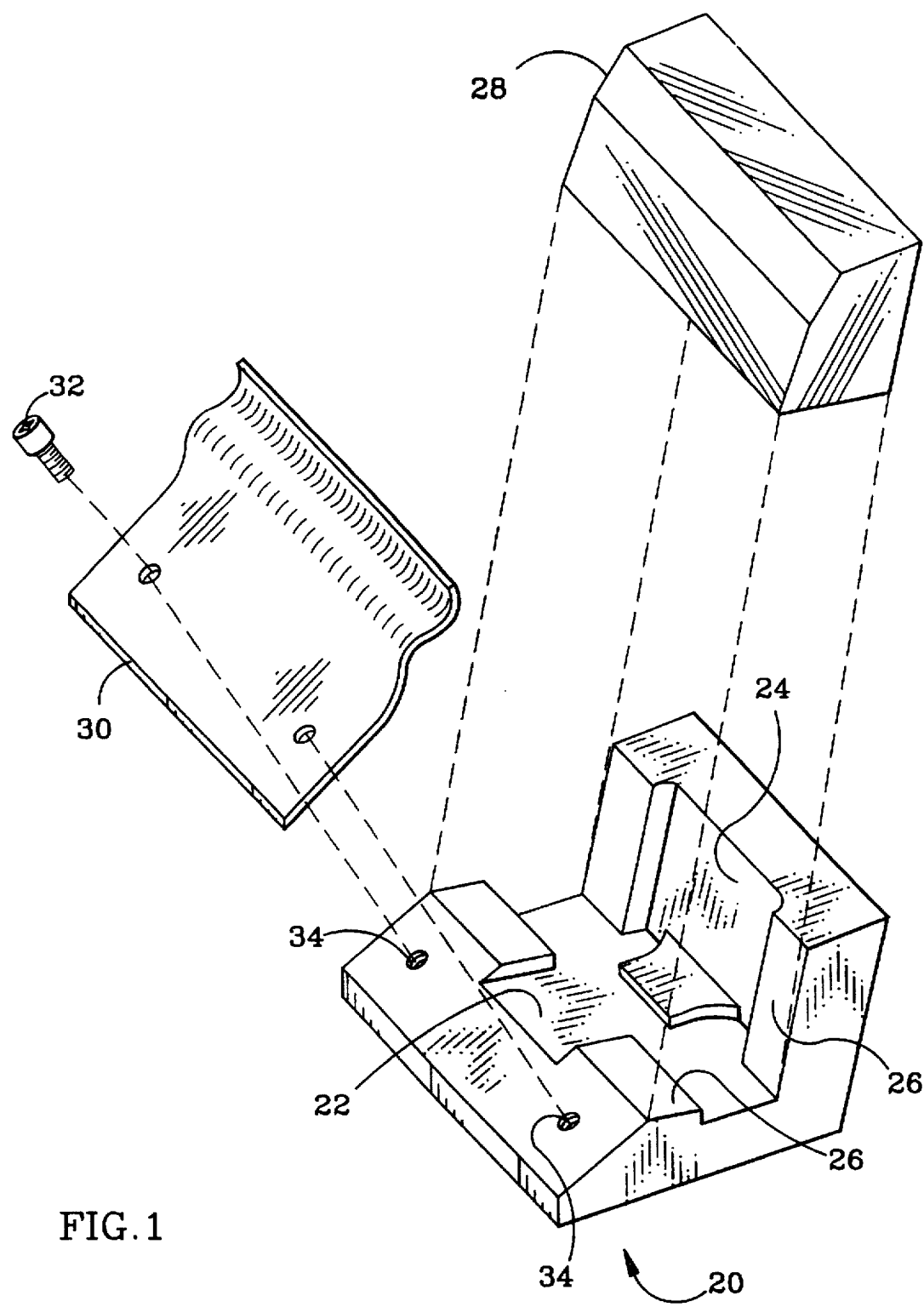
FIG. 1 is an exploded perspective view of one embodiment of the invention that prevents an optical component from moving in all but one direction.

As shown in the accompanying drawings, the present invention is a mount for optical components that uses springs to restrain movement in several directions simultaneously. One embodiment of the invention is shown in FIG. 1. An L-shaped base 20 has two faces 22 and 24 for accepting an optical component 28, shown here as a crystal. Faces 22 and 24 have three and two mounting surfaces 26, respectively, the mounting surfaces 26 of a given face being substantially parallel to the other mounting surfaces 26 of that face. Faces 22 and 24 are oriented so that they fit snugly against optical component 28. Faces 22 and 24 are shown here as being substantially perpendicular to each other, since crystals and other optical components frequently have right-angled corners.

The elevated mounting surfaces 26 can be formed by selectively machine cutting or etching away part of the faces 22 and 24. Alternatively, one could weld or braze the mounting surfaces 26 to the remainder of the faces 22 and 24. The mounting surfaces 26 can also be formed through metal casting leaving raised bosses or pads. The mounting surfaces 26 are shown here as rectangles, since that is often the easiest shape to machine. The dimensions of the mounting surfaces 26 depend upon the size of the optical component 28. For example, the mounting surface 26 is preferably 0.1 inch×0.1 inch for a cubical optical component having sides approximately 0.5 inch in length, whereas 0.25 inch× 0.25 inch is preferable for a cubical component with 2 inch long sides. The optical component 28 rests in the plane defined by the three mounting surfaces 26 that are part of face 22. Since a plane is defined by three points, a fourth mounting surface is not necessary. Optical component 28 also butts up against the two mounting surfaces 26 that are part of face 24. A third mounting surface is not required on face 24, since two mounting surfaces are sufficient to prevent the optical component 28 from wobbling or rotating once it is resting on face 22. In general, the further the mounting surfaces on a given face are separated from each other, the more stable the alignment of the optical component 28 will be. In this and in the subsequently disclosed embodiments, the mount will function without the presence of mounting surfaces 26, but the alignment of optical component 28 is much more stable when they are present.

When a side spring retainer 30 is in place, face 24 and its mounting surfaces 26 keep optical component 28 from rotating or tilting within the plane defined by the mounting surfaces 26 of face 22. As shown more clearly in FIG. 2, the side spring retainer 30 urges the optical component 28 towards both faces 22 and 24 of base 20. This technique works best when the optical component 28 has a chamfer or face which mates with the side spring retainer 30, as illustrated in FIG. 2.

The side spring retainer 30 is most easily mounted to the base 20 with screws 32 that match screw holes 34, although other means can be used, such as bolting, welding or spring fasteners. The side spring retainer 30 can be formed from many different materials, such as corrosion resistant steel, beryllium copper, or heat treatable carbon steels. Its thickness depends upon the size of the optical component 28 to be mounted, but may be as thin as 0.007 inch for a cubical optical component of approximately 0.5 inches in length. It preferably has a serpentine shape which gives it spring-like properties, although one could design equivalent structures using other kinds of springs. The design shown here is especially well suited for use with small optical components. The manufacture of the particular spring retainers 30 shown in FIG. 2 is conventional and involves squeezing a thin piece of metal in a die press to give it its shape, followed by heat treating the metal in an oven and quenching it to a spring temper hardness. It can then be grit blasted or shot peened to remove the oxidation scale.

As shown in FIGS. 1 and 2, optical component 28 is constrained from moving in all but one direction, namely, parallel to faces 22 and 24 and side spring retainer 30. Before optical component 28 can slide, however, it must overcome static frictional forces resulting from side spring retainer 30 pressing optical component 28 against the mounting surfaces 26.

Figure 4:
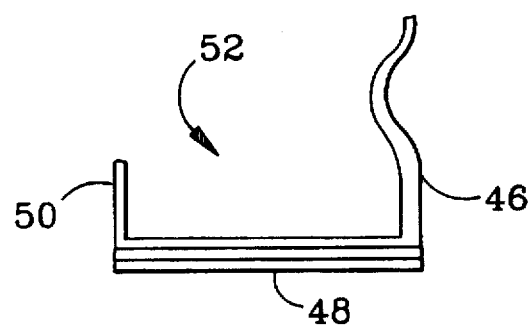
FIG. 4 is a plan view of the side spring retainer assembly including the finger spring and tang for the embodiment shown in FIG. 3.
Figure 5:
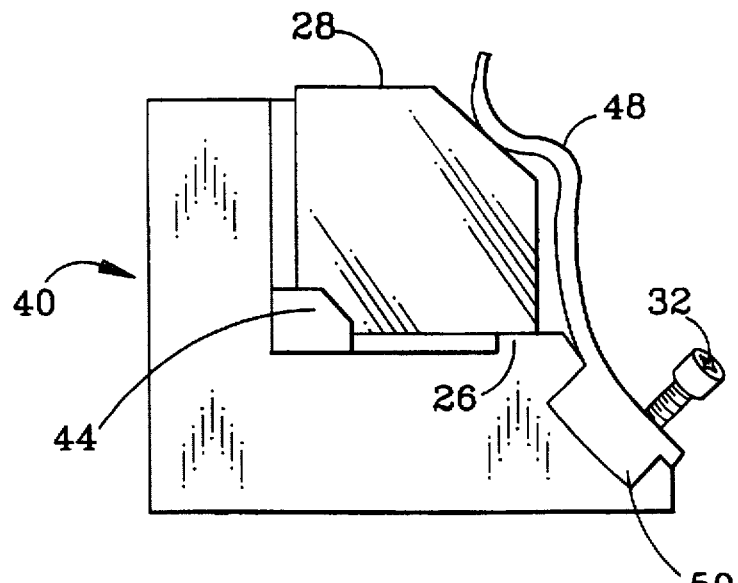
FIG. 5 is a rear elevational view of the embodiment of the invention shown in FIG. 3, with the side spring retainer engaging the optical component, and the tang mating with the base.
Figure 6:
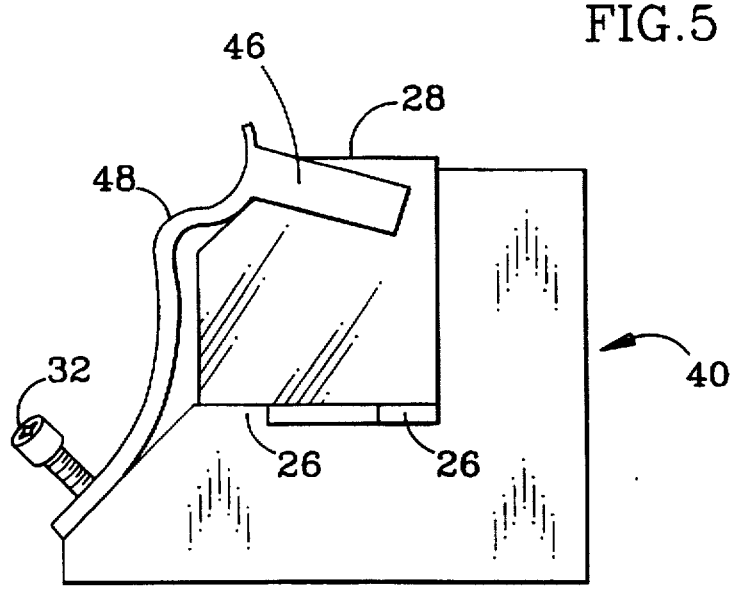
FIG. 6 is a front elevational view of the embodiment of the invention shown in FIG. 3, with the side spring retainer and the finger spring engaging the optical component.

An embodiment of the invention that constrains movement of a mounted optical component in all possible directions is shown in FIG. 3. As before, a base 40 comprises angled faces 22' and 24' with three and two mounting surfaces 26', respectively. The optical component 28 is prevented from sliding since it is squeezed between a third face 44 (that functions like one of the mounting surfaces 26' and is shown here to be adjacent and perpendicular to faces 22' and 24') and a finger spring 46 that is attached to a side spring retainer 48 that otherwise can have the same configuration as the retainer 30 of FIG. 2. The finger spring 46 urges the optical component 28 towards the third face 44. A tang 50 is attached to one end of the side spring retainer 48 and fits over the edge of base 40, so that the side spring retainer 48 does not slide away from the third face 44. The tang 50 is required when the spring retainer 48 is so thin that it would slide in between adjacent threads of screws 32. The side spring retainer assembly 52 comprising the finger spring 46, side spring retainer 48 and tang 50 must properly match the length of the optical component 28 to be secured. If the side spring retainer assembly 52 is too long, for example, optical component 28 will not touch the third face 44 and the finger spring 46 simultaneously. The relationship between the finger spring 46, side spring retainer 48 and tang 50 is more clearly shown in FIGS. 4, 5 and 6. FIG. 4 is a plan view of the side spring retainer assembly 52 showing that the shape of the finger spring 46 is similar to that of the side spring retainer 48. FIG. 5 shows the tang 50 folded over the edge of the base 40, whereas FIG. 6 shows the finger spring 46 contacting the optical component 28. The construction of side spring retainer assembly 52 is conceptually similar to that of side spring retainer 30, except that more manufacturing steps are involved.

Figure 7:
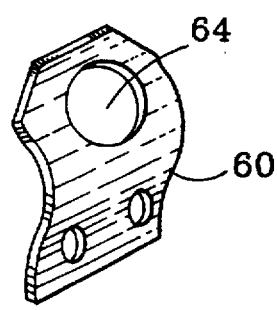
FIG. 7 is a perspective view of an end spring retainer.
Figure 8:
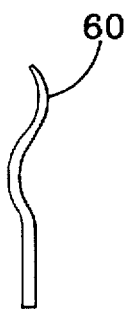
FIG. 8 is a side elevational view of the end spring retainer shown in FIG. 7.
Figure 9:
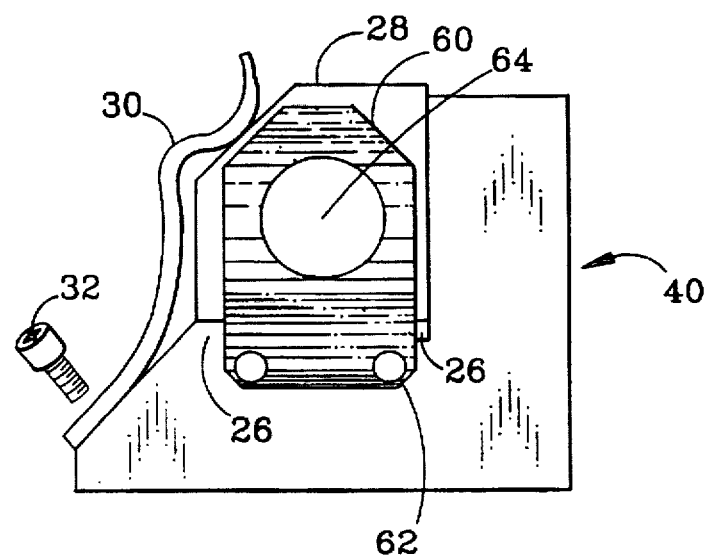
FIG. 9 is a front elevational view of an embodiment of the invention, with the end spring retainer shown in FIGS. 7 and 8 mounted to the base and engaging the optical component.

It is possible to completely restrain the optical component 28 without using the side spring retainer assembly 52 by instead using the base 40 in conjunction with the side spring retainer 30 and an end spring retainer 60 shown in FIGS. 7 and 8. The end spring retainer 60 has a serpentine contour similar to that of side spring retainers 30 and 48, which gives it its spring characteristics. In this embodiment, the side spring retainer 30 is used just as in FIGS. 1 and 2, and in addition, the end spring retainer 60 is mounted with screws 32 through screw holes 62 in base 40, as indicated in FIG. 9. In this way, the optical component 28 is urged towards the third face 44 of base 40. A hole 64 in the end spring retainer 60 allows for the passage of light beams.

Figure 10:
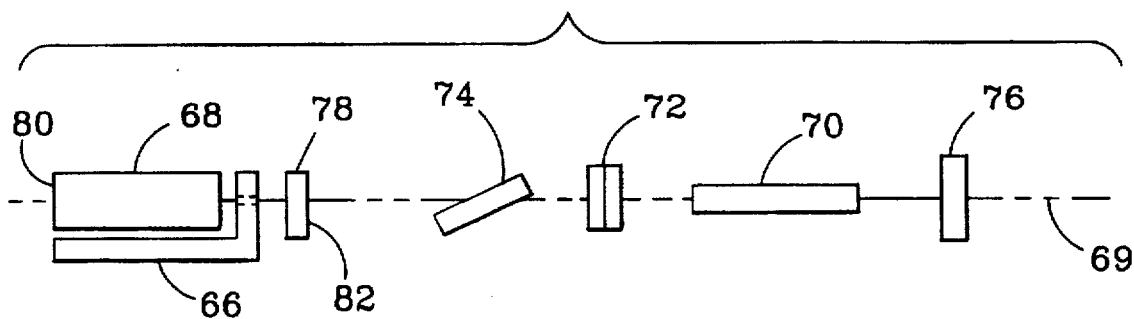
FIG. 10 is a schematic diagram of a laser resonator for which the invention mitigates problems of shifting alignment.

The mount described herein is useful for laser resonators, for which the laser output is sensitive to shifts in the alignment of optical components. This is particularly true if crystals form part of the resonator. An example of a resonator in which the mount can be used to mitigate alignment problems is shown in FIG. 10, in which a mount 66 is used to secure an OPO (optical parametric oscillation) crystal 68. This resonator is similar to the one disclosed in FIG. 3 of U.S. Pat. No. 5,181,211 and comprises several optical components, all of which are aligned along an optical axis 69. A laser rod 70, a Q-switch 72, and a polarizing plate 74 such as a Brewster plate are situated between a reflecting end mirror 76 and an output mirror 78. The surface 80 of OPO crystal 68 furthest from the laser rod 70 is coated to reflect radiation from the laser rod, while transmitting the longer wavelengths produced by the OPO crystal 68. All of the other surfaces internal to the resonator have anti-reflection coatings for the radiation produced by the laser rod 70 except for surface 82 of output mirror 78, which faces the polarizing plate 74 and is partially transmitting. The OPO crystal 68 uses radiation from the resonator to produce nonlinear effects. For example, if the laser rod 70 generates radiation at 1.06 microns, a crystal of potassium titanyl phosphate (KTiOPO$_4$ or "KTP" for short) can be used to generate laser radiation at 1.57 and 3.5 microns through a process known as optical parametric oscillation. The alignment of the OPO crystal 68 can be better maintained using the mount described herein than with conventional mounts, particularly when the resonator is subjected to vibrations and temperature cycling. In those situations involving temperature cycling, optical alignment problems are less severe when the mount and optical bench are constructed from the same material.

While particular embodiments of the invention have been shown and described, numerous variations and alternate embodiments will occur to those skilled in the art. Accordingly, it is intended that the invention be limited only in terms of the appended claims.

I claim:

1. A mount for holding an optical component, comprising:
   a base for accepting said optical component, said base comprising first and second non-parallel faces oriented to support said component, each of said faces including a respective plurality of mutually spaced elevated mounting surfaces for contacting said optical component; and
   a spring retainer secured to said base, said spring retainer holding said optical component in said mount by simultaneously urging said component towards both of said faces.

2. The mount of claim 1, wherein said first face comprises three substantially parallel mounting surfaces, and said second face comprises two substantially parallel mounting surfaces.

3. The mount of claim 1, further including a third face.

4. The mount of claim 3, wherein said third face is oriented substantially perpendicular to both said first and second faces.

5. The mount of claim 4, wherein said spring retainer urges said optical component towards said first and second faces, and includes a finger spring that urges said optical component towards said third face.

6. The mount of claim 5, wherein said spring retainer further includes a tang that fits over an edge of said base to prevent said spring retainer from slipping relative to said base.

7. The mount of claim 6, wherein said first face includes three substantially parallel mounting surfaces, and said second face includes two substantially parallel mounting surfaces.

8. The mount of claim 3, further comprising a second spring retainer secured to said base to urge said optical component towards said third face.

9. The mount of claim 8, wherein said first face includes three substantially parallel mounting surfaces, and said second face includes two substantially parallel mounting surfaces.

10. A mount for holding an optical component, comprising:
    a base for accepting said optical component, said base comprising a plurality of non-parallel faces oriented to support said component, at least two of said faces including respective pluralities of mutually spaced elevated mounting surfaces for contacting said optical component; and
    a plurality of spring retainers secured to said base, said spring retainers acting from substantially different directions to hold said optical component by simultaneously urging said component towards a plurality of said faces.

11. The mount of claim 10, wherein said faces are oriented substantially perpendicular to each other.

12. An improved optical resonator of the type in which a laser rod, a polarizing plate and a Q-switch lie along an optical axis between mirrors, and a crystal for nonlinear generation of laser radiation lies along said optical axis outside said mirrors, wherein the improvement comprises:
    a mount for holding said crystal, said mount comprising:
      a base for accepting said crystal, said base comprising first and second non-parallel faces oriented to support said crystal, each of said faces including a respective plurality of mutually spaced elevated mounting surfaces for contacting said crystal; and
      a spring retainer secured to said base, said spring retainer holding said crystal in said mount by simultaneously urging said crystal towards both of said faces.

13. A mount for holding an optical component, comprising:

a base for accepting said optical component, said base comprising first and second non-parallel faces oriented to support said component, wherein said first face comprises three substantially parallel mounting surfaces, and said second face comprises two substantially parallel mounting surfaces; and a spring retainer secured to said base, said spring retainer holding said optical component in said mount by simultaneously urging said component towards a plurality of said faces.

14. A mount for holding an optical component, comprising:

a base for accepting said optical component, said base comprising first and second non-parallel faces oriented substantially perpendicular to each other to support said component, and a third face that is oriented substantially perpendicular to both said first and second faces; and a spring retainer secured to said base, said spring retainer holding said optical component in said mount by simultaneously urging said component towards a plurality of said faces.

15. The mount of claim 14, wherein said spring retainer urges said optical component towards said first and second faces, and includes a finger spring that urges said optical component towards said third face.

16. The mount of claim 15, wherein said spring retainer further includes a tang that fits over an edge of said base to prevent said spring retainer from slipping relative to said base.

17. The mount of claim 16, wherein said first face includes three substantially parallel mounting surfaces, and said second face includes two substantially parallel mounting surfaces.

18. The mount of claim 14, further comprising a second spring retainer secured to said base to urge said optical component towards said third face.

19. The mount of claim 18, wherein said first face includes three substantially parallel mounting surfaces, and said second face includes two substantially parallel mounting surfaces.

20. An improved optical resonator of the type in which a laser rod, a polarizing plate and a Q-switch lie along an optical axis between mirrors, and a crystal for nonlinear generation of laser radiation lies along said optical axis outside said mirrors, wherein the improvement comprises:

a mount for holding said crystal, said mount comprising:

a base for accepting said crystal, said base comprising first and second non-parallel faces oriented to support said crystal, wherein said first face comprises three substantially parallel mounting surfaces, and said second face comprises two substantially parallel mounting surfaces; and a spring retainer secured to said base, said spring retainer holding said crystal in said mount by simultaneously urging said crystal towards a plurality of said faces.

* * * * *